United States Patent [19]

Beggs

[11] Patent Number: 4,849,622

[45] Date of Patent: Jul. 18, 1989

[54] PANORAMIC OPTICAL SYSTEM WITH VERY SHARP BEAM CONTROL

[76] Inventor: William C. Beggs, 4110 Shawnee La., NE., Atlanta, Ga. 30319

[21] Appl. No.: 145,509

[22] Filed: Mar. 22, 1988

Related U.S. Application Data

[62] Division of Ser. No. 812,054, Dec. 23, 1985, Pat. No. 4,745,343, which is a division of Ser. No. 651,742, Nov. 7, 1984, Pat. No. 4,593,345, which is a division of Ser. No. 405,723, Aug. 6, 1982, Pat. No. 4,486,691, and Ser. No. 165,131, Jul. 2, 1980, abandoned.

[51] Int. Cl.[4] .............................................. G01J 3/36

[52] U.S. Cl. .................................. 250/216; 250/239; 315/158

[58] Field of Search ................ 315/155, 156; 313/112, 313/113; 362/326, 308, 309, 327, 337; 340/945, 972; 250/214 AL, 216, 239

[56] References Cited

U.S. PATENT DOCUMENTS 4,177,083 12/1979 Kennedy ............................ 250/239

4,225,782 9/1980 Kuppenheimer, Jr. et al. ... 250/216

4,710,630 12/1987 Kuppenheimer, Jr. et al. ... 250/216

*Primary Examiner*—David K. Moore

*Assistant Examiner*—Brian S. Palladino

*Attorney, Agent, or Firm*—Neuman, Williams, Anderson & Olson

[57] ABSTRACT

A radiation receiver is disclosed which, with no moving parts, detects both the azimuth and elevation of radiation in a panoramic field external to the receiver. The receiver includes at least one radiation sensitive element and a refractor. The refractor includes a plurality of prisms distributed on the walls of the refractor and forming a distributed focal plane adjacent to the refractor. The radiation sensitive element is located in the depth of field of the focal plane, and the image of at least one portion of the source of radiation is focused by the refractor from the far field of the refractor onto the radiation sensitive element. The disclosed combination reduces the possibility of damage by the radiation to the radiation receiver.

5 Claims, 3 Drawing Sheets

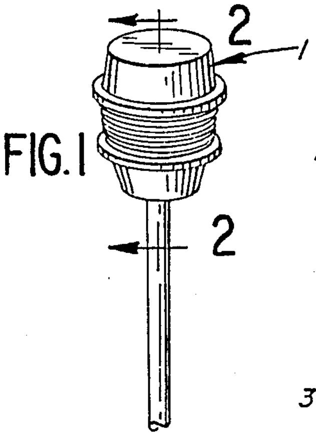
FIG. 1
FIG. 2
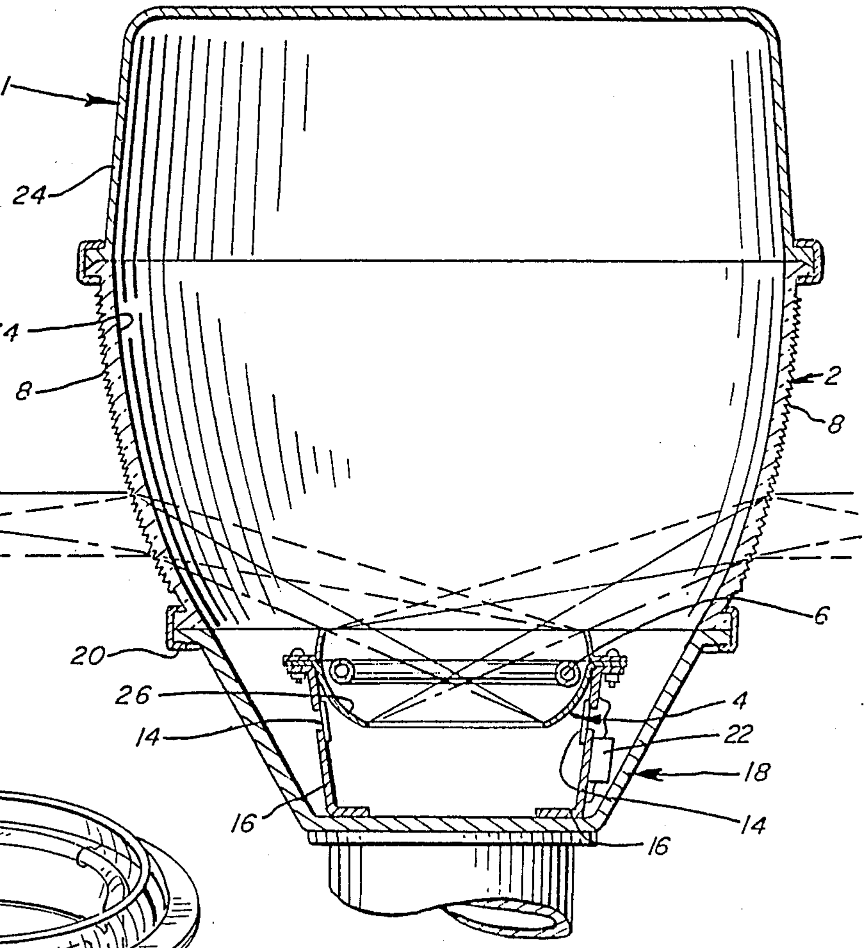
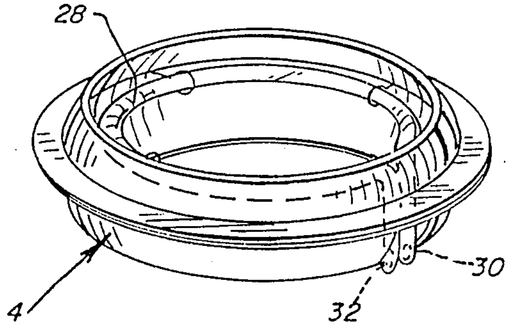
FIG. 3
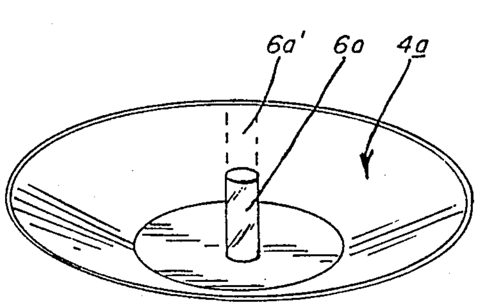
FIG. 4
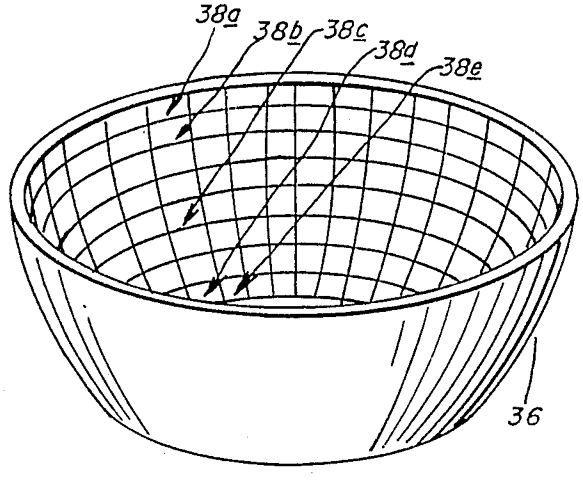
FIG. 5

PANORAMIC OPTICAL SYSTEM WITH VERY SHARP BEAM CONTROL

This is a division of U.S. Pat. No. 4,745,343, application Ser. No. 812,054 filed Dec. 23, 1985, which is a division of application Ser. No. 651,742, filed Nov. 7, 1984, U.S. Pat. No. 4,543,345, which is a further division of application Ser. No. 405,723, filed Aug. 6, 1982, U.S. Pat. No. 4,486,691 and its parent application Ser. No. 165,131 filed July 2, 1980, abandoned.

This invention relates to light emitters. More specifically it relates to a flashlamp which generates a beam of light omnidirectionally in a horizontal plane and sharply controls the vertical distribution of the beam. This invention also relates to flashlamp discharge controlling methods, and more particularly to a method of achieving an effective candella power (ECP) flash for visual signaling. The method also uses widely varying capacitances which are small, lightweight and of low cost.

This invention also relates to radiation detectors, and more particularly to a controlled azimuth and elevation discriminating system.

A signaling effect may be produced by a flashing light. In applying this principle at airports, in the signaling of aircraft in flight as they are approaching the runways, an effective light beam is required which is omindirectional in the horizontal plane while extending in a controlled vertical beam from plus two degrees to plus ten degrees in the vertical plane. The sharp cut-off of the lower edge of the beam is required so that at zero degrees there will be a minimal effect upon motorists and upon the environment on the ground around the installation of the flashlamps.

Although electrical flashlamps for repetitive flashing are often thought of as being utilized in applications for signaling aircraft, there are also other applications. Those other applications include warning beacons for obstructions, lights on moving vehicles, photography, and flash photolysis of chemicals. When a flashing light is utilized in photography, the flash output is accumulated on film so that the results of a low-intensity, long-duration flash are essentially equal to the results of a high-intensity, short-duraction flash of the same color. When utilized in systems in which the human eye functions as the flash detector, the effects are much the same as the effects achieved on film, i.e., the effect is cumulative. However, the accumulation occurs, in the case of the human eye, only when the duration of the flash is less than about onetwentieth of a second and the interval between flashes exceeds about two-tenths of a second.

Observation of flashing light is five times more effectively detected by the human eye than the output of a steadily emitted light of the same operating intensity. The five fold increase in effective signaling, which the flashing light achieves, is determined by dividing the intensity of the light by the Blondel-Rey constant of 0.2. Blondel and Rey, and others, arrived at the figure of 0.2 through a wide range of empirical experiments involving the perception of flashing lights. Douglas et al. at the National Bureau of Standards of the United States established 0.2 as the practical standard constant used in determinning the Effective Candella Power of flashing lights for approved use at airports in the United States.

There is a need for economical flashing signal lights at airports, and such lights should be variable in intensity from five thousand plus or minus two thousand candellas ECP to fifteen hundred plus or minus four hundred fifty candellas ECP to seven hundred plus or minus two hundred candellas ECP. These intensities are needed in a beam which is omnidirectional in the horizontal plane and extends from ten degrees above the horizon down to two degrees above the horizon with a very sharp cut off between two degrees and zero degrees. This sharp cut-off prevents interference with automobile traffic and other such ground activity and prevents other adverse environmental effects around the airport where such flashing lights are involved. In order to accommodate the greatest of these three levels of intensity, the beam intensity and the beam volume dictates an energy storage requirement in excess of fifty joules per flash at one flash per second.

In the past, emitting sharply controlled light beams where efficiency of energy input was a consideration typically was accomplished by using large and heavy lens arrays. The lenses were large in order to accurately refract the light from high energy point sources and create a beam viewed by a distant observer. Since great amounts of energy were not available from quite small point sources, because such sources would be melted, larger sources were used, and such larger sources required larger optics for sharp beam control. Where large refractors were used in the larger optics systems, attempts were made to minimize the sizes by moving them as close to the source as possible. However, moving the refractors close to the source meant that their heat tolerance had to be higher and their refractive power had to be greater for such shorter focal distances. Quite heavy thicknesses of glass were often used. A drawback of such thick glass was that, although the refractive power was increased, the transmission losses were also increased.

Lighter weight plastic refractors were also used. However, such refractors have less refractive power and do not completely focus an axially located source. When such axially located source is not completely focused by the refractor, very sharp beam cut-off is not achieved, although lightweight low energy broad pattern control very suitable for street and area lighting is accomplished.

Typical beam emitters and panoramic light emitters are shown in U.S. Pat. Nos. 3,739,169 issued June 12, 1973, 3,818,218 issued June 18, 1974, 3,249,750 issued May 3, 1966, 3,448,260 issued June 3, 1969, 3,775,605 issued Nov. 27, 1973 3,697,736 issued Oct. 10, 1972, 3,705,303 issued Dec. 5, 1972, 3,427,747 issued Feb. 11, 1969, and 3,766,375 issued Oct. 16, 1973. The arrangements shown in the constructions illustrated by these patents utilize highly concentrated sources for the beam or fail to produce a beam with a sharp cut-off. In those cases where the source of the beam is distributed, the energy is dispersed and the surface temperature and life of materials is improved but the characteristics of the beam are sacrificed.

The operative mechanisms of flashlamps are gradually ionized and then deionized through the duration of the flash. This is true whether the flashlamp is electrically powered or chemically powered. The gradual ionization and then deionization is a continuous process throughout the ionized state and is controlled by the rate at which energy is made available to the ionizable material and by the rate at which energy is removed from such material. When the energy is removed at a higher rate than that at which it is being made available, the ionization decreases.

In the past, energy was put into any specific flashlamp for flashing purposes only at two impedance levels. The high impedance energy input which initiated ionization was limited in voltage and energy to a level which would not damage the flashtube envelope. This high impedance energy has been termed the "trigger" and has been specified for reliable initiation of ionization, or "triggering", for different lamps and lamp applications as follows: Class I at 4 kv min., 3 microseconds maximum rise time, with 3.2 millijoules typical trigger coil input; Class II at 10 kv min., 3 microseconds maximum rise time, with 20 millijoules typical trigger coil input; and Class III at 20 kv min., with 0.12 joules typical trigger coil input.

In earlier circuits the main discharge terminals of the flashlamp were connected to the main energy storage capacitor, and the voltage of that capacitor had to be maintained during triggering in a narrow voltage range. In other words, the main energy storage capacitor voltage had to be high enough to transfer increasing energy into the lamp ionizable material before the trigger energy was dissipated. This minimum voltage level, called the Minimum Flashing Requirement, was coordinated with a specified trigger pulse in one of the classes stated above. The maximum voltage level of the main energy storage capacitor was specified to assure that the lamp would not fire without trigger energy. This maximum voltage level is termed the Maximum Anode Voltage. Energy stored at a voltage between the two limits, i.e., Maximum Anode Voltage to minimum flashing requirement, determines a second general impedance level. Such stored voltage supports increasing ionization as the trigger energy is used up. Such stored energy also was utilized to supply the major and remaining portion of the energy used in the flash.

The main energy storage capacitor was operated in the voltage range between the maximum anode voltage and the minimum flashing requirement. For many flashlamps, this constituted a variation of plus or minus twenty percent of the main energy storage capacitance voltage between the maximum anode voltage and the minimum flashing requirement. A mathematical determination of such energy stored in the capacitor, as just described, is, in joules, equal to one-half the capacity of the capacitor expressed in farads times the voltage on the capacitor squared.

Electrolytic capacitors are small and inexpensive for their energy storage capability compared to foil-and-film capacitors operating at the one kv level. This level is particularly suited to many flashlamps. The application of electrolytic capacitors as discharging energy storage devices has been less than satisfactory heretofore because they are typically manufactured in a capacity tolerance of a plus fifty and minus ten percent of their capacity rating. Because they are electro-chemical devices, the characteristics of the electrolytic capacitors are further subject to temperature variations.

Heretofore a specified Effective Candella Power from a flashlamp was obtained with a tolerance of plus or minus ten percent of the specified ECP. When this ECP was combined with optical variations of plus or minus ten percent of mean beam strength, a luminaire output variation was produced of less than plus or minus twenty-five percent by using foil-and-film capacitors of plus or minus ten percent tolerance charged to a voltage which was controlled to within plus or minus one percent. In an attempt to utilize electrolytic capacitors as discharging energy storage devices, that is, as devices turned off only by lamp extinction after discharging more than twenty percent of their voltage, such capacitors were charged through a resistance to effect a constant charge in a specified fraction of a second rather than to a constant voltage. Capacitors of plus fifty percent tolerance charged, of course, to a lower voltage than did capacitors of minus ten percent tolerance. Stored charge in Coulombs equals the product of Capacity times Volts. The voltage variation was 1.5/0.90 or 1.66 to 1 before any temperature variations, and compensating effors to reduce the voltage variations increased the variations in the stored energy. When a different level of intensity was required from the same flashing signal light, different banks of capacitors were connected to the lamps in order to maintain the lamp voltages required.

Typical prior art patents concerning flashlamp controlled discharge methods are as follows: U.S. Pat. No. 3,355,625 issued Nov. 28, 1967, No. 3,413,518 issued Nov. 26, 1968, No. 3,349,284 issued Oct. 24, 1967, and 3,551,741 issued Dec. 29, 1970.

The present invention overcomes the difficulties and problems of the prior art in that it uses dynamic impedance matching methods which allow the use of main energy storage capacitors having much wider voltage variations than those heretofore used. The device of the present invention utilizes a distributed focal plane which allows finer detail and also allows the use of a distributed source which spreads the heat energy of the source, lowers its surface temperature and improves the life of its materials.

In the device of the present invention, a flashlamp and reflector may be replaced with a radiation detector to accommodate a sharply controlled omnidirectional azimuth and elevation discriminating system.

Accordingly, it is an object of the present invention to provide an improved panoramic light emitter having a very sharp cut-off in the vertical plane of the emitted light beam.

It is a further object of the present invention to provide a panoramic light emitter using distributed light sources which also distribute the heat associated with such sources.

It is a further object of the present invention to provide an improved panoramic light emitter utilizing a reflector which directs substantially all of the light beams incident thereon past the light source and avoids condensing the said beams in said source.

It is a further object of the present invention to provide an optical system which increases the resolution of variations of the beam edges.

It is a further object of the present invention to provide an optical system in which the distributed focal plane is panoramically imaged.

It is a further object of the present invention to provide an optical system in which a complete conical surface of a reflector is panoramically imaged.

It is a further object of the present invention to provide a flashlamp discharge control dynamically impedance matching the main energy storage capacitance to the load.

It is a further object of the present invention to provide a flashlamp discharge control system which incorporates lightweight capacitors for storing electrical energy for discharge into an arc load.

It is a further object of the present invention to provide a flashlamp discharge control system for varying the discharge of stored energy into the lamp over wide limits from pulse to pulse by varying only the voltage on the main energy storage capacitors.

It is a further object of the present invention to provide a flashlamp discharge control system which incorporates means to vary the pulse length of energy into the lamp so as to control the RMS current in the capacitor-lamp discharge circuit.

It is a further object of the present invention to provide a flashlamp discharge control system which incorporates means for providing longer wavelength outputs of the flashlamp by controlling the discharge current levels within the maximum capabilities of the flashlamp.

It is a further object of the present invention to provide a panoramic radiation receiver which is simultaneously sensitive to radiation from a plurality of directions.

It is a further object of the present invention to provide an improved panoramic radiation receiver which incorporates means for simultaneously detecting and discriminating among radiations from a plurality of directions.

It is a further object of this invention to provide an arc discharge control method for controlling the RMS current in the capacitor-arc discharge circuit.

These and yet additional objects and features of the invention will become apparent from the following detailed discussion of exemplary embodiments, and from the drawings and appended claims.

In a preferred form of the present invention, a flashlamp is provided for signaling aircraft approaching a runway. The flashlamp includes a refractor for receiving a plurality of beams of light and distributing said beams in a plurality of directions. The refractor also includes a plurality of lenses having a common focal plane. The flashlamp incorporates also an illuminator emitting a plurality of light beams, an a reflector disposed in the depth of field of the focal plane directing a portion of the light beams toward the refractor. The light beams are focused by the refractor to form of an image of the reflector in the far field of the refractor.

A second form of the invention is a radiation receiver for detecting radiation emanating from at least one source of radiation outside of the receiver. The receiver includes at least one radiation sensitive element and a refractor. The refractor includes a plurality of prisms distributed on the walls of the refractor and forming a distributed focal plane adjacent to the refractor. The radiation sensitive element is located in the depth of field of the focal plane, and the image of at least one portion of the source of radiation is focused by the refractor from the far field of the refractor onto the radiation sensitive element.

A further form of the invention is an arc discharge control circuit which includes a pulsing electrical arc for dissipating energy, a storage member comprising a plurality of capacitors adapted to store energy at different voltages and to initiate their individual discharges at successively lower voltages, and means for initiating the flow of energy from the storage member into the arc.

BRIEF DESCRIPTION OF THE DRAWINGS

For a complete understanding of this invention, reference should be made to the accompanying drawings in which:

FIG. 1 is a perspective view of the panoramic light emitter of the present invention mounted upon a vertical support member;

FIG. 2 is an enlarged cross-sectional view of the panoramic light emitter shown in FIG. 1 and showing light beams emanating therefrom focused in the far field and taken along lines 2–2;

FIG. 3 is an enlarged perspective view of a portion of FIG. 2 which principally comprises a circular flash tube and its associated reflector, surrounding the tube;

FIG. 4 is a perspective view of an alternative form of the flash tube in FIG. 3 and an alternative form of the associated reflector in FIG. 3;

FIG. 5 is a perspective view of an alternative form of a portion of the construction shown in FIG. 2, shown in enlarged scale, which portion is a matrix of photo diodes which may be installed in the construction of FIG. 2 in place of the circular lamp and reflector shown in FIG. 3 when the invention is adpated to be used as a radiation receiver;

DETAILED DESCRIPTION OF THE PREFERRED EMBODIMENT

Figure 9:
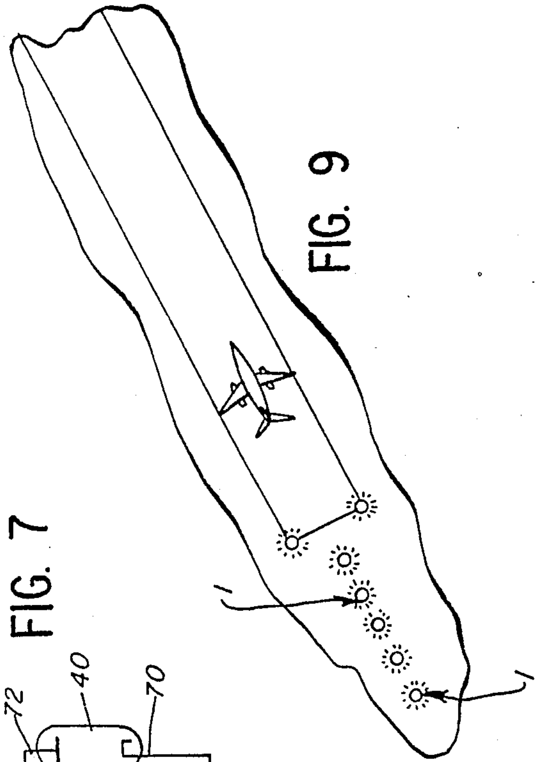
FIG. 9 is a plan view of a runway equipped with a plurality of panoramic light emitters flashing in seqqence toward the end of an airport runway.

As shown in FIGS. 1 and 9 the panoramic light emitter of the present invention is particularly adapted for installation adjacent the ends of airport runways. A series of such emitters is located so as to flash at fraction of a second intervals leading toward the runway and identifying the front corners of the runway. These lights in the series repeat themselves each every second so as to guide the pilots of aircraft safely to the landing. The emitters are mounted on vertical support members, as shown in FIG. 1 and are erected a minimal distance above the plane of the runway. As may be noted especially in FIGS. 1 and 9, the light emitters of the present invention are constructed to provide a flashing light in a 360° arc so that pilots of aircraft may immediately determine the proper landing end of the runway from innumerable points around the airport.

Figure 2B:
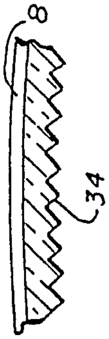
FIG. 2B is an enlarged section of the wall of the refractor portion of the panoramic light emitter shown in FIG. 2A and taken along lines 2B—2B.
Figure 2A:
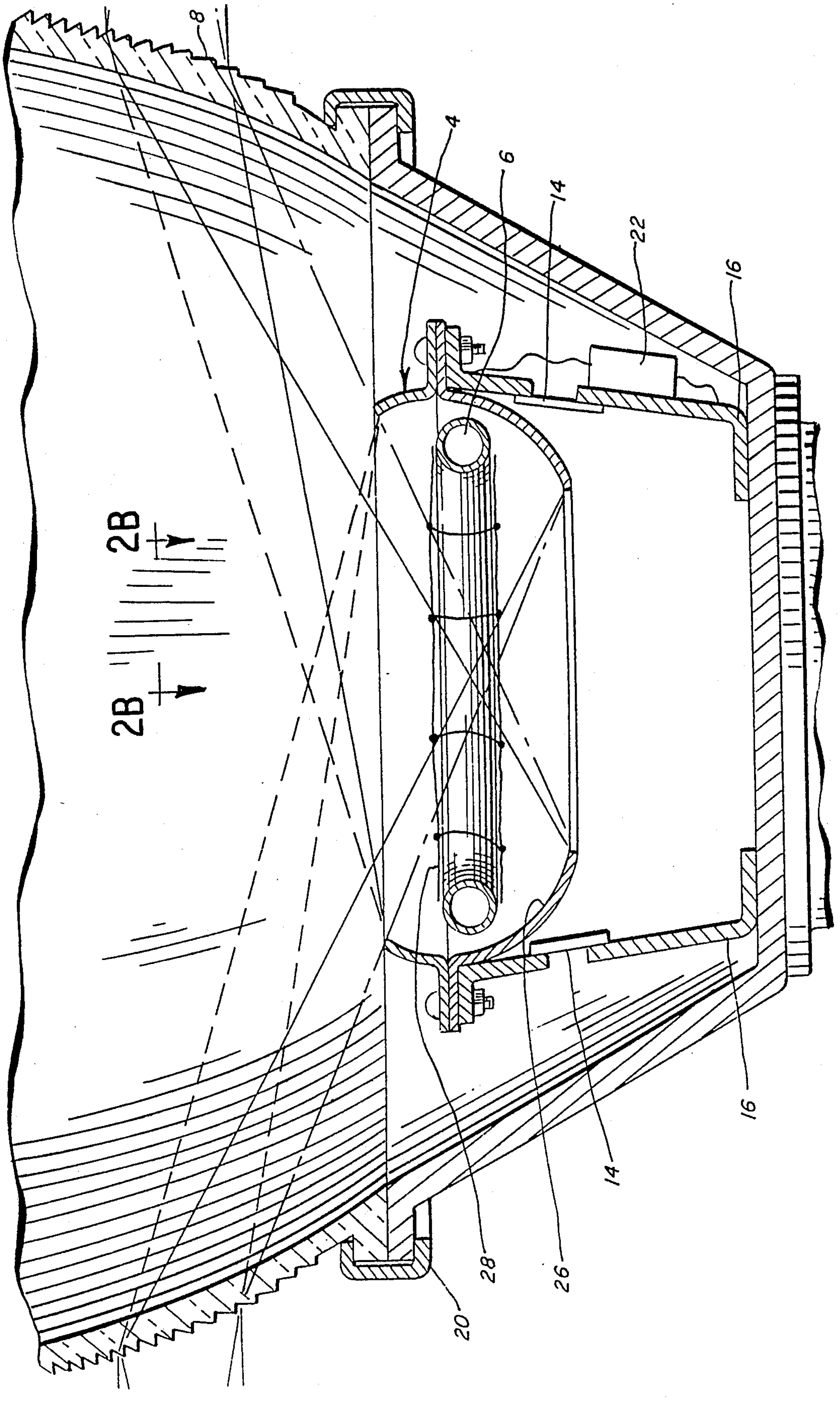
FIG. 2A is an enlarged view of a portion of the panoramic light emitter shown in FIG. 2.

Referring now to FIG. 2, the panoramic light emitter comprises a plastic refractor 2 imaging a reflector 4 which is illuminated by a circular lamp 6. The top edge of the reflector 4 is imaged by horizontal lenses 8 on the outside of refractor 2 to create the bottom edge 10 of the light beam 12. The relationship of the optical components, refractor 2 and reflector 4, is maintained by insulators 14, supports 16, base pan 18 and clamp 20. Preferably, the clamp 20 extends all the way around the interface of pan 18 and refractor 2. The circular lamp 6, which is a form of flash tube, is triggered to its "on" state by high voltage generator 22. Heat is primarily removed by convection through the open bottom and open top of the reflector 4 and rises into dome 24 through which heat is transferred to the outside air. The cooled air within the dome 24 then falls down the interior walls of refractor 2 and of base pan 18 and between insulators 14 and supports 16 to repeat its convection cooling of reflector 4 and of the flash tube 6.

Base pan 18 and dome 24 are preferably constructed of lightweight aluminum, which is corrosion protected, as are supports 16 and clamp 20.

The reflector 4 is preferably formed of aluminum with a specular reflective surface 26. The surface 26 reflects at least eighty percent of the light which is incident upon it. Preferably, the surface has a clear anodized coating to insure a long life of reflectivity.

The reflector 4 is operated at the same voltage as trigger wire 28 (see FIG. 3) which is wrapped around flash tube 6 to avoid voltage breakdown. The reflector 4 is supported by low capacity insulators 14 to minimize the required trigger energy which is supplied in the 15 kv range. The nominal 15 kv energy is supplied by the high voltage generator 22 once each second to trigger the flash tube 6. The anode and cathode of flash tube 6 are by-passed with low inductance capacitors contained in the high voltage generator 22 directly to the return connection of the 15 kv high voltage generator 22, thus preventing the 15 kv energy from being expended anywhere other than in the flash tube 6. Such an arrangement reduces the insulation requirements in the light emitter 1.

Referring now to FIG. 3, the flash tube 6 and the reflector 4 form a source of illumination. The source is comprised of a generally conically shaped reflector 4 which is internally illuminated by circular flash tube 6. The generally conically shaped surface is optimized for the single turn circular flash tube which is illustrated by having each vertical section, when viewed in a plane which includes the vertical axis of the source, seen as a parabola with its focus at the tube 6. A generally conical surface for cooperation with a two-turn tube would itself have a different element shape. Because the reflector 4 and the tube 6 are within the depth of field of the focal plane of the associated refractor 2, they are accurately imaged in the vertical cross-section of beam 10. The electrodes 30 and 32, which are disposed in the adjacent ends of flash tube 6 are so close to each other that light variations caused by them are integrated in the horzontal plane by Blondel prisms 34 (see also FIG. 2B) on the interior surface of refractor 2.

Referring now to FIG. 4, a source similar to that shown in FIG. 3 is illustrated. The source in FIG. 4 is comprised of a generally conically surfaced reflector **4*a* illuminated by a linear flash tube 6*a*. The image 6*a'* of the flash tube 6*a* is located in the focal plane of a cooperating refractor (not shown) situated with respect to the reflector 4*a* in the same relationship as refractor 2 is situated with respect to reflector 4. When the image 6*a'* is viewed by the cooperating refractor, the image 6*a'* extends beyond and off the top edge of the reflector 4*a*. Because the image 6*a'* is at full reflected brightness at the top edge of the reflector 4*a* and does not exist off the reflector 4*a*, the image 6*a'*** has a very sharp edge which is projected as a sharp edge of a beam.

Referring now to FIG. 5, a radiation sensitive matrix 36 is illustrated. The construction of the emitter 1, shown in FIG. 2 may be readily modified by substituting the matrix 36 for the combination of reflector 4 and flash tube 6, and with suitable sensitive electronic registry means the emitter construction becomes a radiation sensitive receiver which discriminates in azimuth and elevation. Matricies of custom photodiodes are recommended as being available on page 2 of EG&G Catalog entitled "*Electro-Optics Division, Condensed Catalog*" Salem, Massachusetts, printed January 1978. Each segment, of the group of segments **38*a*, 38*b*, 38*c*, 38*d* and 38*e* in the matrix 36, produces a separate electrical signal when radiation to which it is sensitive falls upon it. The matrix 36 is located in the focal plane of a cooperating refractor (not shown). The cooperating refractor for matrix 36 would not have Blondel prisms because integration in the horizontal plane is not desired. When the optical system which includes matrix 36 in its focal plane has a common axis vertically oriented, a signal from segment 38*a* indicates a source of radiation in the lower-most portion of the imaged far field. Similarly, a signal from segment 38*b* indicates a radiation source just above the lowermost portion of the imaged far field, but still below the center of the imaged far field. Similarly, a signal from segment 38*c* indicates a source of radiation above the center of the imaged far field, and a signal from segment 38*d* indicates a source of radiation at the top edge of the imaged far field. A signal from segment 38*e* indicates a source of radiation at the same elevation as the source of radiation imaged on 38*d***, but at a different azimuth. Electronic scanning of the segment signals eliminates the need for mechanical scanning in an omnidirectional azimuth and elevation discriminating receiver.

Figure 6:
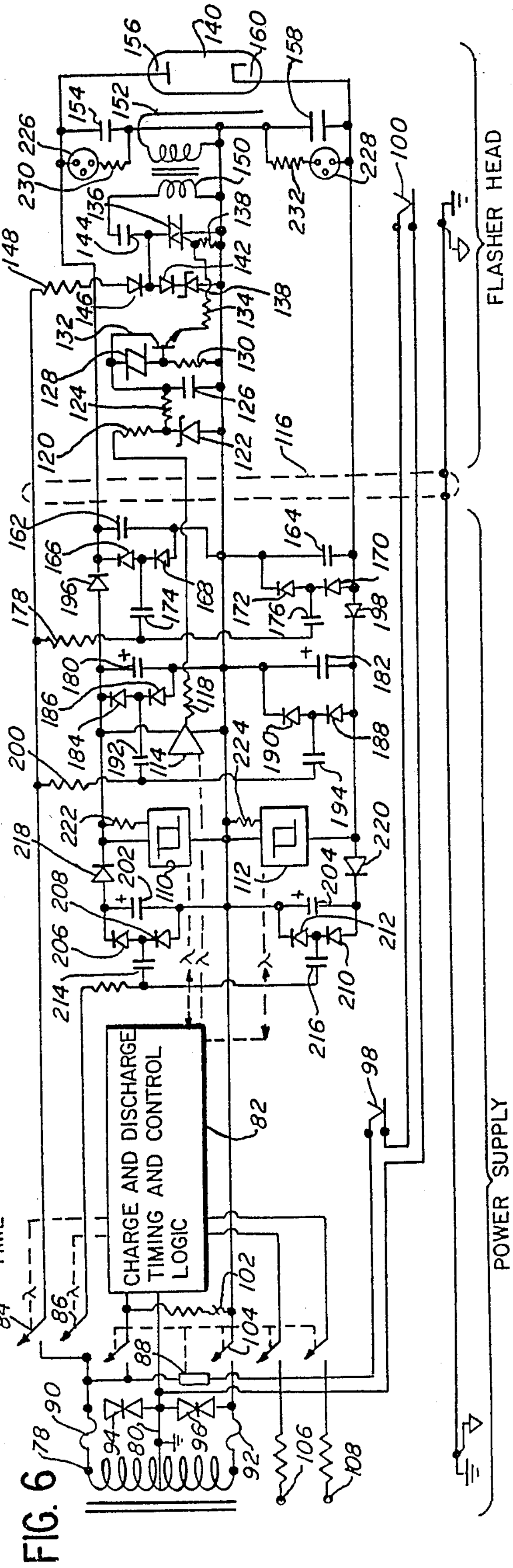
FIG. 6 is a schematic drawing and block diagram of a flashlamp discharge control circuit for use with the panoramic light emitter shown in FIG. 1.

Referring now to FIG. 6, a schematic drawing and block diagram of a flashlamp discharge controlling circuit is shown for use with the panoramic light emitter shown in FIG. 1. Further detailed discussion of this figure will be reserved to follow the discussion of the schematic drawing in FIG. 7, the concept of which is applied to the discharge controlling circuit of FIG. 6.

Figure 7:
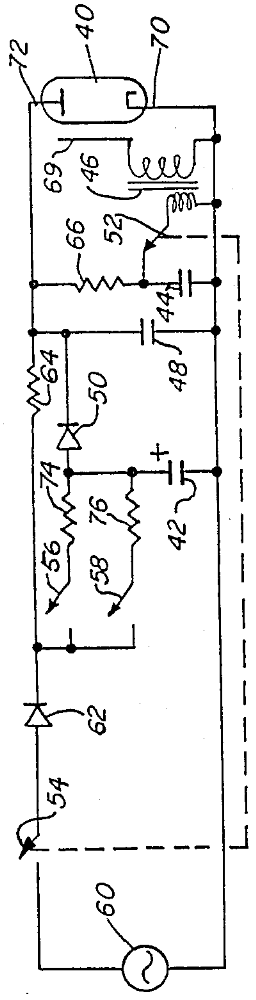
FIG. 7 is a schematic drawing of a basic flashlamp discharge control system, the concept of which is applied in the discharge control circuit of FIG. 6.

In FIG. 7, most of the energy to be discharged into a flash tube 40 is stored in the electrolytic capacitor 42 at voltage levels which are usually below the Minimum Flashing Requirement Voltage specified by the lamp manufacturer. The conventional triggering of the lamp 40 is accomplished by discharging the trigger capacitor 44 through the trigger impedance transformer 46 when the "kindling" capacitor 48 is charged to a voltage level always above the Minimum Flashing Requirement and below the Maximum Anode Voltage. When the "kindling" capacitor 48 discharges down to a voltage below the capacitor 42, which "kindling" capacitor 48 discharging through the arc to a lower voltage constitutes a Dynamic Impedance Matching, then capacitor 42 begins to discharge through the diode 50 into the partially ionized lamp 40 and increases the ionization of the lamp 40 until discharged down to a voltage level which can no longer sustain ionization in the lamp. Then the lamp 40 ionization percentage gradually decreases, and the lamp impedance gradually rises to such a high value that, when the "kindling" capacitor 48 subsequently is recharged to a value above the lamp Minimum Flashing Requirement, the lamp 40 will conduct to such an insignificant extent as to be considered an open circuit, and the lamp is then considered extinguished.

The cycle timing of the circuit of FIG. 7 is complete in one second, and it repeats itself every second. Switch 52 and switch 54 operates at the same time and cycle once per second. Switch 56 and switch 58 are operated to change the Effective Candella Power of the lamp 40 output.

The circuit of FIG. 7 conveniently models the disclosed flashlamp discharge control method. At 0.25 seconds after the lamp 40 has been triggered, flashed, and allowed to cool, switch 52 is opened and switch 54 is closed. If switch 56 and switch 58 are opened, then the lowest Effective Candella Power has been selected. The lamp 40 Minimum Flashing Requirement is 250 volts, and Maximum Anode Voltage is 315 volts when it is a Radio Shack 272-1145 Flashlamp. The trigger impedance matching transformer, which may be a Radio Shack 272-1146, puts out a 4 kv minimum pulse when 250 volts from the trigger capacitor 44 is connected to the primary winding through switch 52. The trigger is a class 1 trigger in voltage and energy. When the power switch 54 is closed, the 240 volt 60 Hertz A.C. line source 60 is connected to the anode of the power rectifier 62 which is a 1 N 5062 rectifier, and current flows on 45 positive half cycles of the A.C. line source 60. This current through resistor 64 charges the 1.0 microfarad capacitor 48 to 300 volts and through resistors 64 and 66 charges the 0.1 microfarad trigger capacitor 44 to above 250 volts. Forty-five cycles after the power switch 54 was closed, the power switch 54 is open-circuited and the trigger switch 52 is closed. Three millijoules of energy flows from the trigger capacitor 44 into the primary of the trigger transformer 46, where its impedance is changed to produce a 4 kilovolt pulse from the secondary. That pulse is applied through a conductor of less than twelve inches in length to the trigger electrode 68 distributed along the outside wall of the lamp 40.

A portion of the 3 millijoules is then coupled through the high impedance wall of the lamp to the interior Xenon gas. Because the lamp cathode 70 is 4 kilovolts away from the trigger electrode 68 and the lamp anode 72 is held by the capacitor 48 to within 300 volts of 4 kilovolts away from the trigger electrode 68, the voltage stresses across the Xenon gas cause ionization of the gas. This reduces the anode-to-cathode impedance of the lamp 40, so that energy stored at 300 volts in "kindling" capacitor 48 will start to discharge into the lamp 40.

Figure 8A:
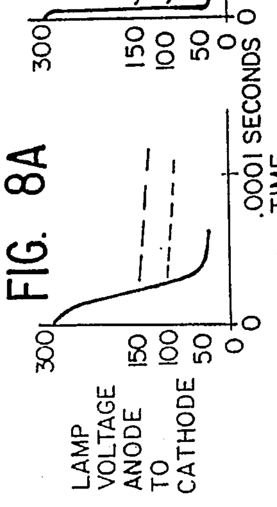
FIG. 8A is a graph of lamp discharge voltage waveforms with respect to time of the lamp of FIG. 7 under three conditions of selected Effective Candella Power.
Figure 8B:
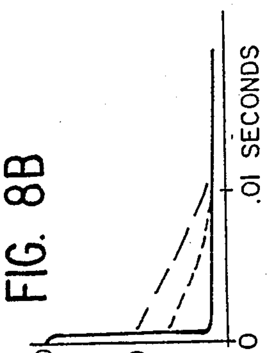
FIG. 8B is a graph of the same conditions shown in FIG. 8A using a time base 100 times greater than that which is specified in FIG. 8A.

Referring momentarily to FIGS. 8A and 8B which depict lamp anode-to-cathode voltages, in conventional fashion the discharge of "kindling" capacitor 48 will follow the solid curves on the graphs of the lamp anode-to-cathode voltage with respect to time and a low Effective Candella Power flash will be the output.

Referring back to FIG. 7, resistor 66 allows the trigger capacitor 44 to be quickly discharged into the primary of transformer 46 without substantially affecting the charge on the capacitor 48 in 0.1 milliseconds. When medium power output is desired for each flash, the power switch 56 is closed. When the power switch 54 is closed, the 100 microfarad electrolytic capacitor 42 is charged through the resistor 74 more slowly than the "kindling" capacitor 48 is charged through its associated resistor 64.

The associated resistor 74 is chosen so that, at the end of 45 cycles of charging from the 60 Hertz line source 60, the electrolytic capacitor 42 has reached approximately 100 volts plus or minus the inverse capacity tolerance of the 100 microfarad electrolytic capacitor 42.

To discharge for a medium Effective Candella Power output from the flashlamp the previous sequence for a low power flash is initiated. However, when the 1.0 microfarad "kindling" capacitor 48 discharges down to just below the voltage level of the 100 microfarad capacitor 42, energy begins to flow from the main storage electrolytic capacitor 42 through the diode 50 and into the lamp 40. Referring momentarily again to FIGS. 8A and 8B, depicting lamp anode-to-cathode voltages, the discharge of the "kindling" capacitor 48 follows the solid curve from 300 volts down to 100 volts, and then it proceeds along the dotted line, supported by the discharge of the electrolytic capacitor 42 for a discharge of greater energy than the low power discharge.

Referring back to FIG. 7, when high power is desired for each flash, the power switch 56 and the power switch 58 are both closed. When the power switch 54 is closed, the 100 microfarad electrolytic capacitor 42 is charged through the resistor 74, and through the resistor 76, in parallel, and still more slowly than the "kindling" capacitor 48 is charged through its associated resistor 64. The resistor 76 is chosen so that, at the end of 45 cycles of charging from the 60 Hertz line source 60, the 100 microfarad capacitor 42 has reached approximately 150 volts plus or minus the inverse capacity tolerance of the 100 microfarad capacitor 42. To discharge for a high Effective Candella Power output from the flashlamp 40, the previous sequence for a low power flash is initiated. However, when the 1.0 microfarad "kindling" capacitor 48 discharges down to just below the voltage level of the 100 microfarad capacitor 42, energy begins to flow from the main energy storage electrolytic capacitor 42, through the diode 50, and into the lamp 40.

Referring momentarily again to FIGS. 8A and 8B, after conventional triggering of the lamp 40, the discharge of the "kindling" capacitor 48 follows the solid curve from 300 volts down to 150 volts and then proceeds along the dashed line, supported by the discharge of the electrolytic capacitor 42 for a discharge of greater energy than the medium power discharge.

The diode 50 is preferably Type 1N 3663 operated entirely within its manufacturer's integrated forward and reverse limits. Motorola, Inc., rates its 1N 3663 diode at a peak repetitive reverse voltage of 400 volts maximum at 25° C. diode case temperature and an average half-wave rectified forward current with a resistive load of 25 amperes at 150° C. case temperature. At 150° C., the instantaneous forward conduction drop at 25 amperes is 0.87 volts. The diode heating equivalent to that endured in a peak 1-cycle surge-current of 400 amperes from a 60 Hertz source when the case temperature is 150° C. is to be avoided.

Referring now to FIG. 6, the power line 78, rated at 240 volts 60 Hertz, center tapped for 120 volts 60 Hertz on either side of the grounded neutral conductor 80, supplies the charge and discharge timing and control logic module 82, a module which is a conventional one and wellknown to those skilled in the art of semi-conductor switching, and the optical relays 84, 86 and the interlock relay 88 through line fuses 90 and 92, and is connected to transient overvoltage limiters 94, 96. The fuse circuits include inductance, and the overvoltage limiters include by-pass capacitance, to prevent electromagnetic interference from passing into or out of the power line 78 at the flasher power supply. The interlock relay 88 is controlled by the power supply interlock switch 98 and flasher interlock switch 100 for safety purposes and controls power to the charge and discharge timing and control logic module 82, to the optional thermostatically controlled heater 102, controls the operation of line power semiconductor switch 104 and controls the 120 volt 60 Hertz current-limited trigger 106, and high signal input 108 from the system distant control box. The open circuiting of either one of the interlock switches 98 or 100 turns off all 120 volt and 240 volt circuits coming into the power supply which also turns off all optical isolator outputs from the logic module 82. Power at the power line 78 is controlled at the system distant control box (not shown) and only exists when the flashlamp system operation is desired by activating the system distant control box.

A plurality of flashlamp optical pulses from a plurality of locations distributed from the end of each airport runway is controlled in intensity and sequence from the system distant control box to prevent any single flash from occurring at the wrong time in a sequence which would mislead an aircraft pilot. Power at the power-line 78 is in parallel with the powerline connection of other similar flasher units so that intensity and sequence of flashing arc controlled entirely through the trigger 106 and high signal input 108 control wires.

When 120 volt/240 volt 60 Hertz grounded neutral power appears at the power line 78, the interlock relay 88 will close and turn on the power switch 104. The charge and discharge timing and control logic module 82 will reset its internal clock and start clocking the power line cycles in order to turn on the low optically controlled switch 84 for forty-five cycles of the 60 Hertz powerline 78.

If low intensity was selected at the system distant control box, then no 120 volt 60 Hertz voltage will appear at the high signal input 108 line, and the high optically controlled switch 86 will never turn on. If high intensity operation was selected, then 120 volt 60 Hertz voltage will appear continuously on the high signal input line 108, and the high optically controlled switch 86 will be turned on for the same forty-five cycles of the 60 Hertz powerline 78 for which the low switch 84 was turned on. If medium intensity operation was selected, then 120 volt 60 Hertz voltage will appear continuously on the high signal input line 108, but the high optically controlled switch 86 will be turned on only during the last fifteen cycles of the time in which the low switch 84 is on. This medium mode is accomplished by the lengthening of the 120 volt 60 Hertz voltage trigger signal in the control box from 0.25 seconds duration, which is 15 cycles of the 60 Hertz voltage trigger signal. The trigger signal is lengthened to prevent high charging through the high optically controlled switch 86, and the longer trigger signal voltage on line 106 is converted to a shorter charging time by the charge and discharge timing and control logic module 82.

Because the flashlamp discharge controlling method of this invention uses dynamic impedance matching to a capacitance whose voltage can be varied over a wide range, the system distant control box can be made to incrementally select any intensity of flash over a wide range from near minimum intensity to maximum intensity just by incrementally varying the length of the trigger signal produced at the distant control box. However, practical applications as airport signaling devices indicate that 5000, 1500 and 700 Effective Candella Powers are sufficient variations. Each time a trigger signal starts, the clock in the logic module 82 is reset and begins counting again. If another trigger signal is not received in 1.1 seconds, then the charging switches 84, 86 are turned off and the module 82, optically isolated outputs to the power Schmitt triggers 110, 112 are also turned off, and this allows the power Schmitt triggers 110, 112 to begin their 4 second discharge of the 2000 microfarad of electrolytic energy storage capacitance to below 50 volts. This assures that the lamp will not flash at a wrong time.

When a trigger signal is received by the logic module 82, one second plus or minus 4/60 of a second from the beginning of the preceding trigger signal, then that subsequent trigger signal is accepted for normal flasher operation and the logic module 82 passes a portion of the trigger signal through an optical isolator to the trigger amplifier 114. The trigger amplifier 114 derives its power from the charged electrolytic energy storage capacitance and passes the trigger signal through the cable 116 and the transient limiting resistors 118 and 120. The trigger signal is transient limited by the zener diode 122 and is time integrated by the resistor 124 and the capacitor 126 to enhance system noise immunity. When the capacitor 126 is charged to 8 volts by the processed trigger signal, then the five layer diode 128 turns on to begin an 8 volt discharge which is developed across the resistor 130 and turns on the transistor 132. The pulse output from the emitter of transistor 132 is current limited by the resistor 134 and turns on the triac 136. The triac gate is shunted by a resistance 138, built into the triac 136 which further enhances system noise immunity.

The supply voltage to triac 136 is limited to 340 volts by the zener diode 138 and allowed to ring for a greater A.C. component in the trigger voltage of the lamp 140 by the diode 142. The 0.3 microfarad lamp trigger capacitor 144 is charged to 340 volts through the diode 146 and the limiting resistor 148. The turn-on of the triac 136 discharges the 0.3 microfarad capacitor through the primary of the trigger transformer 150 which has a 50 to 1 turns ratio raising the trigger impedance so that a 15 kv class II trigger pulse is delivered to the lamp 140 through the trigger electrode 152. Because the return of the 15 kv pulse developed in the secondary of the trigger transformer 150 is directly by-passed through the 0.15 microfarad capacitor 154 to the lamp anode 156, and through the 0.15 microfarad capacitor 158 to the lamp cathode 160, the maximum available trigger energy is applied to the high impedance xenon gas inside the lamp 140 and begins to reduce that gas impedance.

Just prior to the start of the 120 volt 60 Hertz trigger signal pulse at the trigger line 106, the "kindling" capacitors 154, 158, 162 and 164, which are of identical ratings for this lamp 140, completed charging to 560 volts each in the polarity provided by the voltage multiplier diodes 166, 168, 170 and 172 and the charging current limited by the foil-and-film capacitors 174, 176 through the low power switch 84 and through the damping resistor 178. At the same time, most of the energy for the low 700 Effective Candella Power flash had been stored as a charge of constant current into the electrolytic capacitances 180, 182 at approximately 270 volts each in the polarity provided by the voltage multiplier diodes 184, 186, 188 and 190, and was current-limited by the foil-and-film capacitors 192 and 194. The power diodes 196 and 198 isolate the "kindling" capacitors 162 and 164 from the low ECP capacitances 180 and 182, and the resistor 200 damps transients. Storage of a portion of the main discharge energy at a voltage not much below the lamp 140 minimum operating requirement assures not only an easy dynamic impedance matching step from the "kindling" capacitors' impedance level while using only a minimal capacity at the "kindling" voltage level, but also provides an intermediate impedance step to the last main energy storage voltage, when that voltage is at a low value, for the medium 1500 Effective Candella Power flash output.

When medium intensity operation is selected, the "kindling" capacitors 154, 158, 162 and 164 and the low ECP electrolytic capacitances 180 and 182 will charge as they did when the low intensity mode of operation was selected. Additionally, the trigger 120 volt 60 Hertz signal on the signal line 106 from the distant control box will be 45 cycles long, and 120 volt 60 Hertz voltage will exist on the high signal line 108, causing the charge and discharge timing and control logic module 82 to turn on the high optically controlled switch 86 during the last fifteen cycles of the time in which the low switch 84 is on. Conduction of the high switch 86 for fifteen cycles of the 60 Hertz line source 78 raises the voltage of the main energy storage electrolytic capacitances 202 and 204 to approximately 160 volts each in the polarity provided by the voltage multiplier diodes 206, 208, 210 and 212 and current-limited by the foil-and-film capacitors 214 and 216. The power diodes 218 and 220 isolate the low energy storage electrolytic capacitances 180 and 182 from the main energy storage electrolytic capacitances 202 and 204 whenever the main energy storage capacitances 202 and 204 are at voltages lower than the voltages on the low capacitances 180 and 182.

When high intensity operation is selected, the "kindling" capacitors 154, 158, 162 and 164 and the low electrolytic capacitances 180 and 182 will charge as they did when the low intensity operation was chosen. The trigger 120 volt 60 Hertz signal at the trigger input line 106 will be the same as it was for the low intensity operation, namely, 15 cycles long, and 120 volt 60 Hertz will exist on the high line 108, causing the charge and discharge timing and control logic module 82 to turn on the high optically controlled switch 86 during all forty-five cycles of the available charging time. Using all forty-five cycles for charging the main energy storage electrolytic capacitances raises them to their maximum charged voltage of approximately 270 volts so they can supply the energy for the high intensity flash of 5000 plus or minus 2000 Effective Candella Power. Using the foil-and-film capacitors 214, 216, 192, 194, 174 and 176 conveniently limits the input currents on any cycle of the line source 78 so that surges associated with resistive charging are avoided, and the foil-and-film capacitors accurately convey controlled amounts of charge to be accumulated by the energy storage capacitances 202, 204, 180, 182, 162, 164, 154 and 158.

Because high intensity operation applies approximately maximum rated electrolytic capacitor working voltage during routine operation of the flashlamp system, the electrolytic capacitors will not deform. Overvoltage stress on the electrolytic capacitors is avoided by the threshhold voltage sensor in each of the two power Schmitt triggers 110 and 112. When the threshhold of either of the sensors is exceeded, the associated power Schmitt trigger is activated, which latter then immediately activates the other power Schmitt trigger through the logic module 82. While the Schmitt triggers are conducting and dissipating energy in their load resistances 222 and 224, they also signal the logic module 82 that they are in heavy conduction, and the low and high optically isolated power switches 84 and 86 are held in a nonconducting mode, although trigger signals are allowed to pass to the lamp 140 to enable the lamp 40 to be triggered at the proper times. Surges in line source 78 can be accommodated, and the flashing of lamp 140 can be continued with this arrangement of the Power Schmitt triggers 110 and 112, although the primary function of these Power Schmitt triggers is to safely discharge the main energy storage capacitances 202, 204, 180 and 182 when the line source 78 voltage is removed.

Neon lamps 226 and 228, and their respective ballast resistors 230 and 232 regulate the "kindling" voltage to within the flashlamp 140 manufacturers' specifications and also indicate circuit functioning for rapid and safe maintenance evaluation. Light emitting diodes (not specifically shown) in the control logic module and in the Power Schmitt triggers also indicate circuit functioning for rapid and safe maintenance evaluation.

The optional thermostatically controller heater 102 warms the electrolytic capacitances 202, 204, 180 and 182 when the ambient temperature falls below minus 35° C. (−31° F.). Use of this heater in combination with premium electrolytic capacitors designed for −55° C. operation insures immediate adequate operation of the flasher down to −55° C. The heater is operated by applying the line source 78 voltage to the power supply while providing no trigger voltage pulse at connection 106.

The charge and discharge timing and control logic module 82 and the circuit components may be appropriately chosen to produce a variety of flashlamp controlled discharge optical output waveforms varying from short high instantaneous intensities of high RMS current value to long low instantaneous intensities of low RMS current value. Other arc devices can be similarly controlled in various applications of the present invention. Such applications are not limited to those which require visual detection.

While particular embodiments of the present invention have been shown, it will be understood, of course, that the invention is not limited thereto since modifications may be made by those skilled in the art, particularly in light of the foregoing teachings. It is, therefore, contemplated by the appended claims to cover any such modifications as incorporate those features which come within the true spirit and scope of the invention.

What is claimed is:

1. A radiation receiver for detecting radiation emanating from at least one source of radiation outside the receiver, said receiver comprising
   at least one radiation sensitive element and a refractor;
   said refractor including a plurality of prisms distributed on the walls of the refractor and forming a distributed focal plane adjacent to the refractor;
   the image of at least one portion of the source of radiation being focused by the refractor from the far field of the refractor onto the radiation sensitive element.

2. The radiation receiver of claim 1 which is simultaneously sensitive to radiation from a plurality of directions.

3. The radiation receiver of claim 1 which is simultaneously sensitive to radiation throughout a field of more than 180°.

4. The radiation receiver of claim 1 which is simultaneously sensitive to radiation throughout a field of not less than 360°.

5. The radiation receiver of claim 1 which is simultaneously sensitive to radiation throughout at least a 90° field.

* * * * *